(12) United States Patent
Kuehn et al.

(10) Patent No.: US 7,980,798 B1
(45) Date of Patent: Jul. 19, 2011

(54) TIE-DOWN ASSEMBLY

(75) Inventors: Bradley T. Kuehn, Sunfield, MI (US); Jerry Cummins, Portland, MI (US); Andrew P. Higgins, Grand Rapids, MI (US); Richard J. VandeKopple, Belmont, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 38 days.

(21) Appl. No.: 12/471,715

(22) Filed: May 26, 2009

Related U.S. Application Data

(63) Continuation-in-part of application No. 12/141,484, filed on Jun. 18, 2008.

(60) Provisional application No. 60/944,671, filed on Jun. 18, 2007, provisional application No. 61/180,477, filed on May 22, 2009.

(51) Int. Cl.
B60P 7/08 (2006.01)
B61D 45/00 (2006.01)

(52) U.S. Cl. .................................. 410/104; 410/105

(58) Field of Classification Search ................. 410/101, 410/103, 96, 117, 102, 105, 116, 77, 104
See application file for complete search history.

(56) References Cited

U.S. PATENT DOCUMENTS

| | | | |
|---|---|---|---|
| 2,688,289 A | 9/1954 | Sterling | |
| 2,688,504 A | 9/1954 | Parker | |
| 2,735,377 A * | 2/1956 | Elsner | 410/105 |
| 2,891,490 A | 6/1959 | Elsner | |
| 3,381,925 A * | 5/1968 | Higuchi | 410/116 |
| 3,422,508 A * | 1/1969 | Higuchi | 410/105 |
| 3,678,876 A | 7/1972 | Alter | |
| 3,765,637 A * | 10/1973 | Watts | 410/116 |
| 4,020,769 A * | 5/1977 | Keir | 410/96 |
| 4,020,770 A | 5/1977 | McLennan et al. | |
| 4,064,811 A | 12/1977 | Copeland | |
| 4,085,684 A | 4/1978 | McLennan et al. | |
| 4,147,122 A | 4/1979 | Merry | |
| 4,229,132 A | 10/1980 | Taylor | |
| 4,256,424 A | 3/1981 | Knox et al. | |
| 4,688,843 A | 8/1987 | Hall | |
| 4,850,769 A | 7/1989 | Matthews | |
| 5,259,711 A | 11/1993 | Beck | |
| 5,320,264 A | 6/1994 | Weir | |

(Continued)

FOREIGN PATENT DOCUMENTS

EP 0795456 9/1997

(Continued)

*Primary Examiner* — Glenn Dayoan
*Assistant Examiner* — SunSurraye Westbrook
(74) *Attorney, Agent, or Firm* — McGarry Bair PC

(57) ABSTRACT

An organization and storage assembly movably coupled with a track having a partially enclosed polygonal channelway, and a base, a mounting lug, a lock actuator, and a first organization and storage accessory. The base is at least partially enclosable in, and slidably translatable along, a polygonal channelway. The mounting lug is mounted to the base to extend exteriorly of the channelway when the base is within the channelway. The lock actuator is movably coupled with the base, for engagement and disengagement of the lock actuator under the influence of a biasing element. A first organization and storage accessory is resiliently coupled with the mounting lug, and can be selectively uncoupled from the mounting lug when the base is at least partially enclosed in a polygonal channelway to enable coupling of a second organization and storage accessory with the mounting lug without uncoupling the organization and storage assembly from a track.

23 Claims, 13 Drawing Sheets

U.S. PATENT DOCUMENTS

| | | | |
|---|---|---|---|
| 5,409,335 | A | 4/1995 | Beck |
| 5,452,972 | A | 9/1995 | Adams |
| 5,609,452 | A | 3/1997 | Looker et al. |
| 5,765,978 | A | 6/1998 | Looker et al. |
| 5,807,045 | A * | 9/1998 | Profit .......................... 410/116 |
| 5,860,777 | A | 1/1999 | Walsh et al. |
| 5,888,040 | A | 3/1999 | Walsh et al. |
| 6,015,250 | A | 1/2000 | Walsh et al. |
| 6,250,861 | B1 | 6/2001 | Whitehead |
| 6,644,901 | B2 | 11/2003 | Breckel |
| 6,712,568 | B2 | 3/2004 | Snyder et al. |
| 6,799,927 | B2 | 10/2004 | Wheatley |
| 6,827,531 | B2 | 12/2004 | Womack et al. |
| 6,846,140 | B2 | 1/2005 | Anderson et al. |
| 7,040,849 | B2 | 5/2006 | Cunningham et al. |
| 7,070,374 | B2 | 7/2006 | Womack et al. |
| 7,156,593 | B1 | 1/2007 | Saward et al. |
| 7,175,377 | B2 | 2/2007 | Womack et al. |
| 7,281,889 | B2 | 10/2007 | Anderson et al. |
| 2006/0045648 | A1 | 3/2006 | Womack et al. |
| 2006/0257225 | A1 | 11/2006 | Klinkman et al. |
| 2006/0263163 | A1 | 11/2006 | Harberts et al. |
| 2007/0036628 | A1 | 2/2007 | Womack et al. |
| 2007/0183860 | A1 | 8/2007 | Smith |

FOREIGN PATENT DOCUMENTS

| | | |
|---|---|---|
| GB | 787750 | 12/1957 |
| GB | 2320278 | 6/1998 |

* cited by examiner

TIE-DOWN ASSEMBLY

CROSS-REFERENCE TO RELATED APPLICATIONS

This application claims the benefit of U.S. provisional application Ser. No. 60/944,671, filed Jun. 18, 2007, and Ser. No. 61/180,477, filed May 22, 2009, and is a continuation-in-part of U.S. application Ser. No. 12/141,484, filed Jun. 18, 2008, each of which is incorporated herein in its entirety.

BACKGROUND OF THE INVENTION

1. Field of the Invention

The invention relates to a tie-down assembly with organization and storage accessories.

2. Description of the Related Art

Prior art tie-down assemblies are well-known structures used in automobiles, trains, airplanes, boats, and the like for securing loads. Some prior art tie-down assemblies are fixedly mounted in a desired location, and others include a movable tie-down apparatus slidable along a track. Those having a movable tie-down apparatus typically comprise some type of locking mechanism that interacts with the track for locking the tie-down apparatus in a selected position along the track. Furthermore, the tie-down apparatus includes an attachment device, such as an eyelet, a loop, or a prior art solid-body cleat, to which the load is secured via a rope or other securing line attached to the load.

BRIEF DESCRIPTION OF THE INVENTION

An organization and storage assembly can be movably coupled with a track having a partially enclosed polygonal channelway and a base, a mounting lug, a lock actuator, and a first organization and storage accessory. The base is at least partially enclosable in, and slidably translatable along, a polygonal channelway. The mounting lug is mounted to the base to extend exteriorly of a polygonal channelway when the base is at least partially enclosed in a polygonal channelway. The lock actuator is movably coupled with the base, has a biasing element for urging the lock actuator orthogonally toward the base when the base is at least partially enclosed in a polygonal channelway, and has a locking projection disposed toward the base and receivable in at least one arcuate cutout for selective engagement of the licking projection with at least one arcuate cutout under the influence of the biasing element. The first organization and storage accessory is resiliently coupled with the mounting lug for support of an article. The first organization and storage accessory can be selectively uncoupled from the mounting lug when the base is at least partially enclosed in a polygonal channelway to enable coupling of a second organization and storage accessory with the mounting lug without uncoupling the organization and storage assembly from a track.

DESCRIPTION OF EMBODIMENTS OF THE INVENTION

Figure 1:
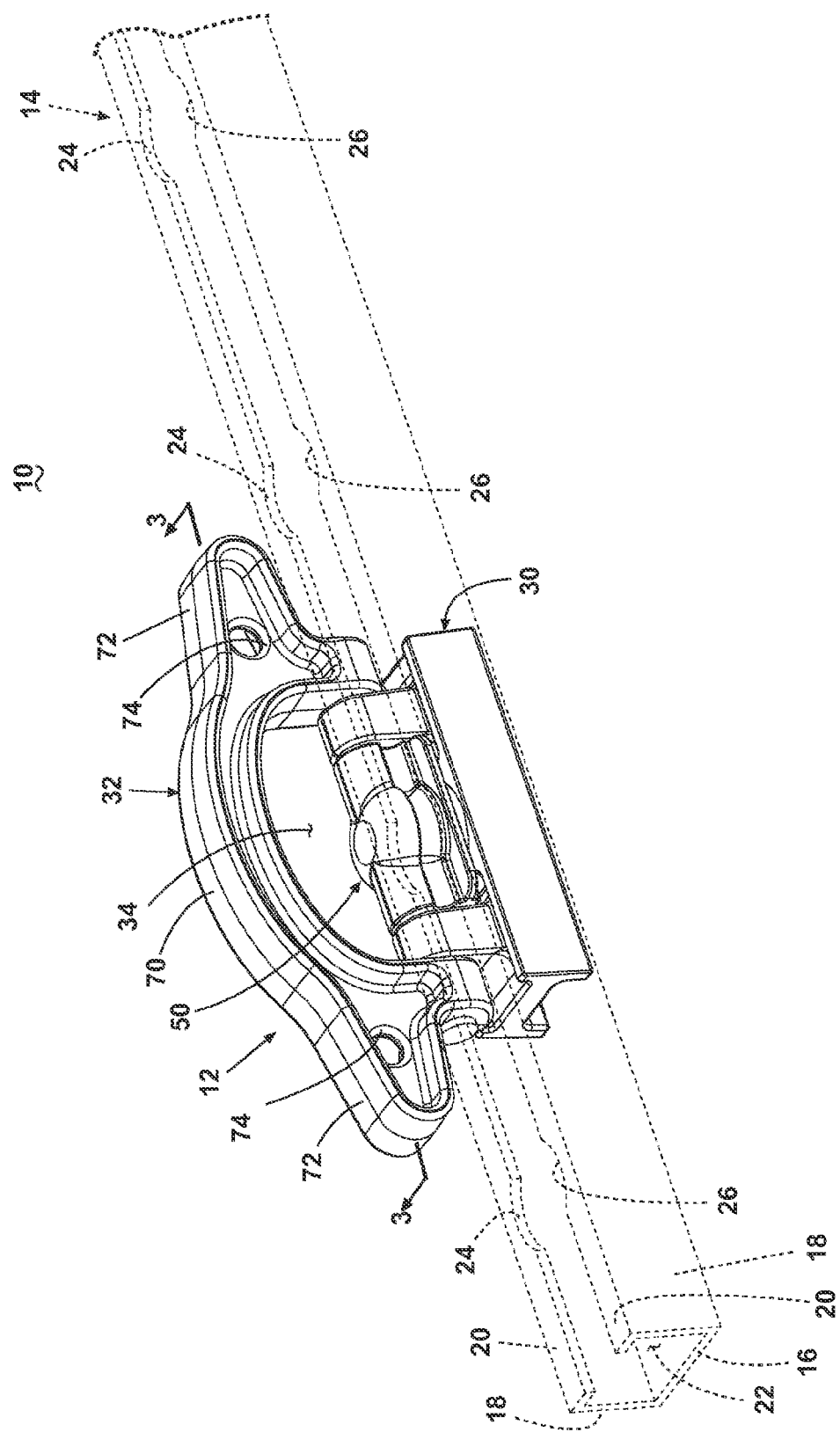
FIG. 1 is a perspective view of a first embodiment of the invention comprising a tie-down assembly having a tie-down attachment assembly slidable within a track.

Referring now to the figures, FIG. 1 illustrates a tie-down assembly 10 according to one embodiment of the invention. The tie-down assembly 10 is illustrated as comprising a tie-down attachment assembly 12 slidably coupled with a track 14. The track 14 is illustrated as an elongated, generally rectilinear member comprising a bottom wall 16, a pair of opposing side walls 18 extending upwardly from opposite edges of the bottom wall 16, and a pair of coplanar flanges 20 extending inwardly from upper ends of the side walls 18 to cooperatively define an elongated raceway 22. Pairs of opposing arcuate cutouts 24, 26 disposed at spaced intervals along the flanges 20 form notches that define locking locations for the tie-down attachment assembly 12. The track 14 can further include apertures 28, illustrated in FIGS. 3-5, for receiving screws, bolts, or other fasteners to mount the track 14 to a selected surface, such as a surface of a vehicle. The track 14 can be mounted to the selected surface in any suitable manner, such as welding, brazing, gluing, and the like, and is not limited to a fastener connection.

Figure 2:
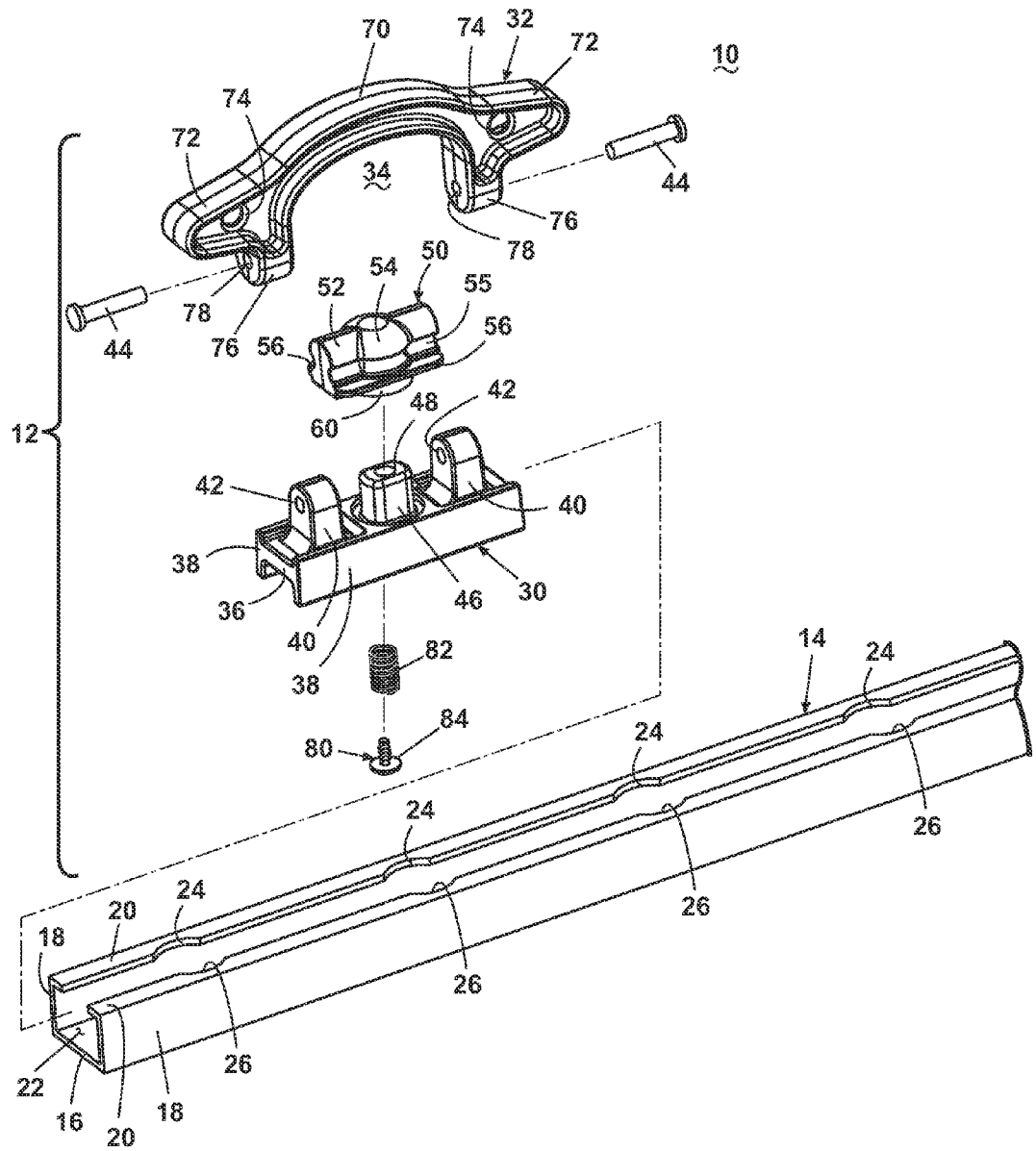
FIG. 2 is an exploded view of the tie-down assembly of FIG. 1.

The tie-down attachment assembly 12 comprises a generally rectilinear base 30 adapted for sliding receipt within the raceway 22, and an attachment member, illustrated as a cleat 32, coupled with the base 30 and forming an opening 34 with the base 30. Referring to FIG. 2, the base 30 comprises a somewhat I-beam shaped member, the "web" of which comprises a generally horizontal platform 36 terminating at generally planar rectilinear vertical legs 38, analogous to the flanges of an I-beam. The legs 38 have a height somewhat less than the distance between the track bottom wall 16 and the track flanges 20 such that the base 30 can slide within the track 14 with the legs 38 positioned between the bottom wall 16 and the flanges 20.

A pair of mounting lugs 40, in the general configuration of pillow blocks, project upwardly from the platform 36, and each lug 40 includes a generally horizontally oriented aperture 42 sized to receive a mounting pin 44 for mounting the cleat 32 to the base 30. The base 30 further comprises a central lug 46 extending orthogonally from the platform 36 intermediate the mounting lugs 40, having a longitudinal aperture 48 orthogonal to the platform 36.

Figure 3:
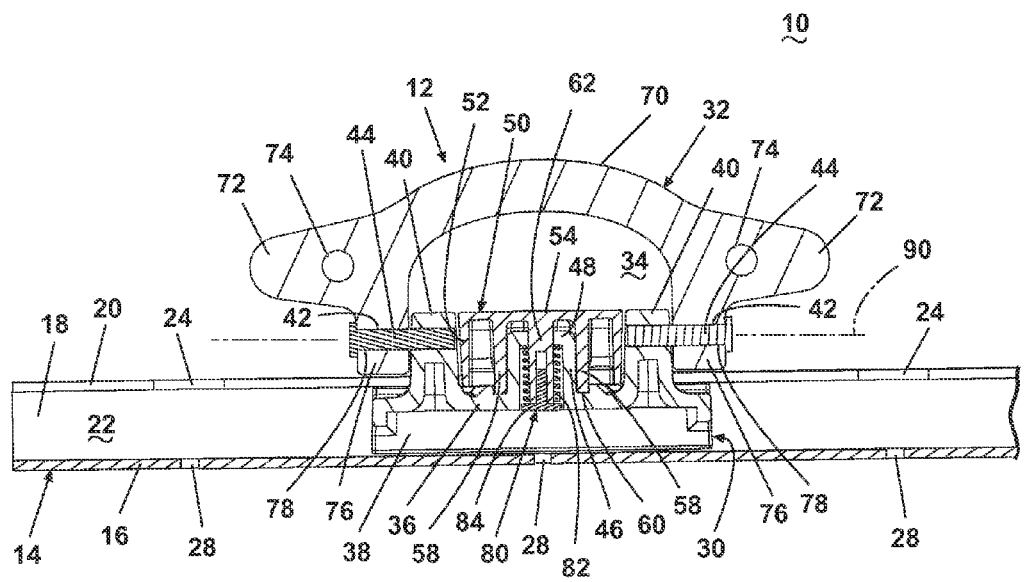
FIG. 3 is a sectional view taken along line 3-3 of FIG. 1 with the tie-down attachment assembly in a locked position.

The central lug 46 is adapted for cooperative registry with a locking mechanism illustrated as comprising a somewhat elongated attachment assembly lock actuator 50. The attachment assembly lock actuator 50 is illustrated as comprising a somewhat elongated, bilaterally symmetrical lock body 52 having a central knob 54 intermediate the ends of the lock body 52. Both the lock body 52 and the central knob 54 have a finger grasp in the form of a pair of opposed continuous grooves 55 extending along opposing sides thereof to facilitate grasping of the lock actuator 50 by a user. The lock actuator 50 further comprises a pair of flange-like stops 56 extending laterally in opposed, coplanar orientation from the lock body 52 and the knob 54, immediately adjacent the continuous groove 55. Internally, as seen in FIG. 3, the knob 54 includes an internally-disposed, generally annular, skirt-like member 58 depending coaxially from the underside of the knob 54 and terminating at a generally annular locking projection 60 that extends away from the lock body 52 and the stops 56. The annular member 58 is adapted for slidable registry with the arcuate cutouts 24, 26 as hereinafter described, and defines a cavity housing a central shaft 62 depending coaxially from the knob 54 and extending away from the locking projection 60. The central shaft 62 is adapted for sliding receipt in the aperture 48 of the central lug 46 of the base 30.

The cleat 32 is illustrated as having a somewhat flattened, ring-like handle or tie-down portion 70 terminating in a pair of opposed, arcuate, longitudinally aligned cleat horns 72, each having an opening 74 extending orthogonal to the longitudinal axis of the cleat 32. The openings 74 can selectively be used to accept a line for securing a load as an alternative or in addition to the tie-down portion 70. The cleat horns 72 transition along an edge to a pair of parallel, spaced legs 76, each having an aperture 78 coaxial with the other and extending parallel to the longitudinal axis of the cleat 32. The apertures 78 are sized for receipt of one of the mounting pins 44 for pivotally coupling the cleat 32 with the mounting lugs 40. The legs 76 are spaced apart a distance adapted to receive the mounting lugs 40 therebetween.

With continued reference to FIG. 3, the tie-down attachment assembly 12 is assembled by coupling the cleat 32 with the base 30 by journaling each mounting pin 44 through the aperture 78 in one of the legs 76 of the cleat 32 and the aperture 42 in one of the mounting lugs 40 on the base 30. The lock actuator 50 is mounted to the base 30 such that the annular member 58 slidingly receives the central lug 46 of the base 30 with the shaft 62 of the lock actuator 50 slidingly received through the aperture 48 in the central lug 46. The lock actuator 50 is secured to the base 30 with a fastener, such as a screw 80, installed in a free end of the shaft 62, and a biasing member, such as a coil spring 82, retained between an internal end of the central lug 46 and a head 84 of the screw 80. The spring 82 biases the screw 80 and the lock actuator 50 toward the base 30, as more fully described below. With the cleat 32 in a fully upright configuration, the lock actuator 50 is framed by the base 30 and the cleat 32. In this configuration, a user can readily grasp the knob 54 with one hand while grasping the cleat 32 with the other hand for moving the cleat 32 along the track 14.

Figure 4:
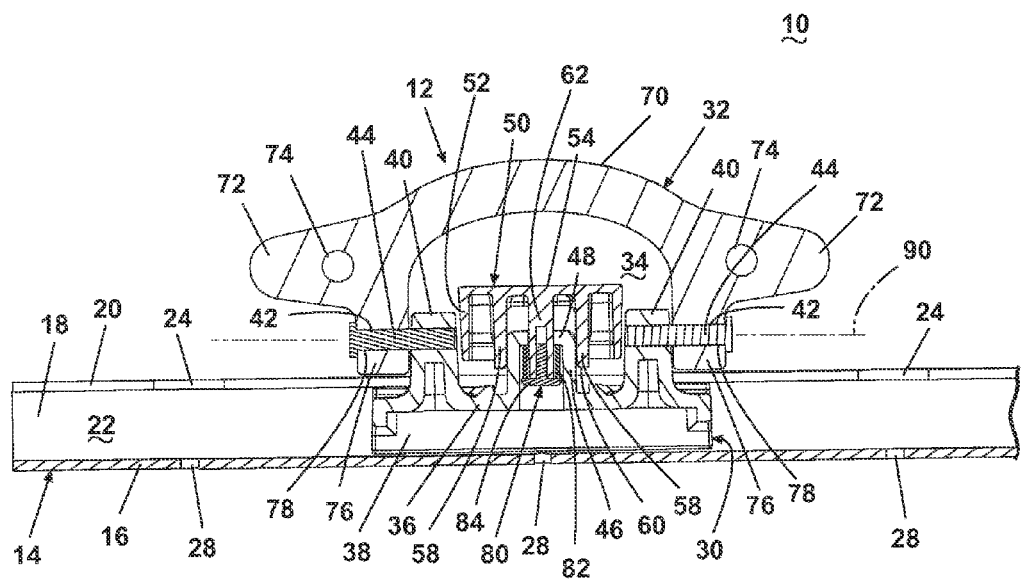
FIG. 4 is a sectional view similar to FIG. 3 with the tie-down attachment assembly in an unlocked position.
Figure 6:
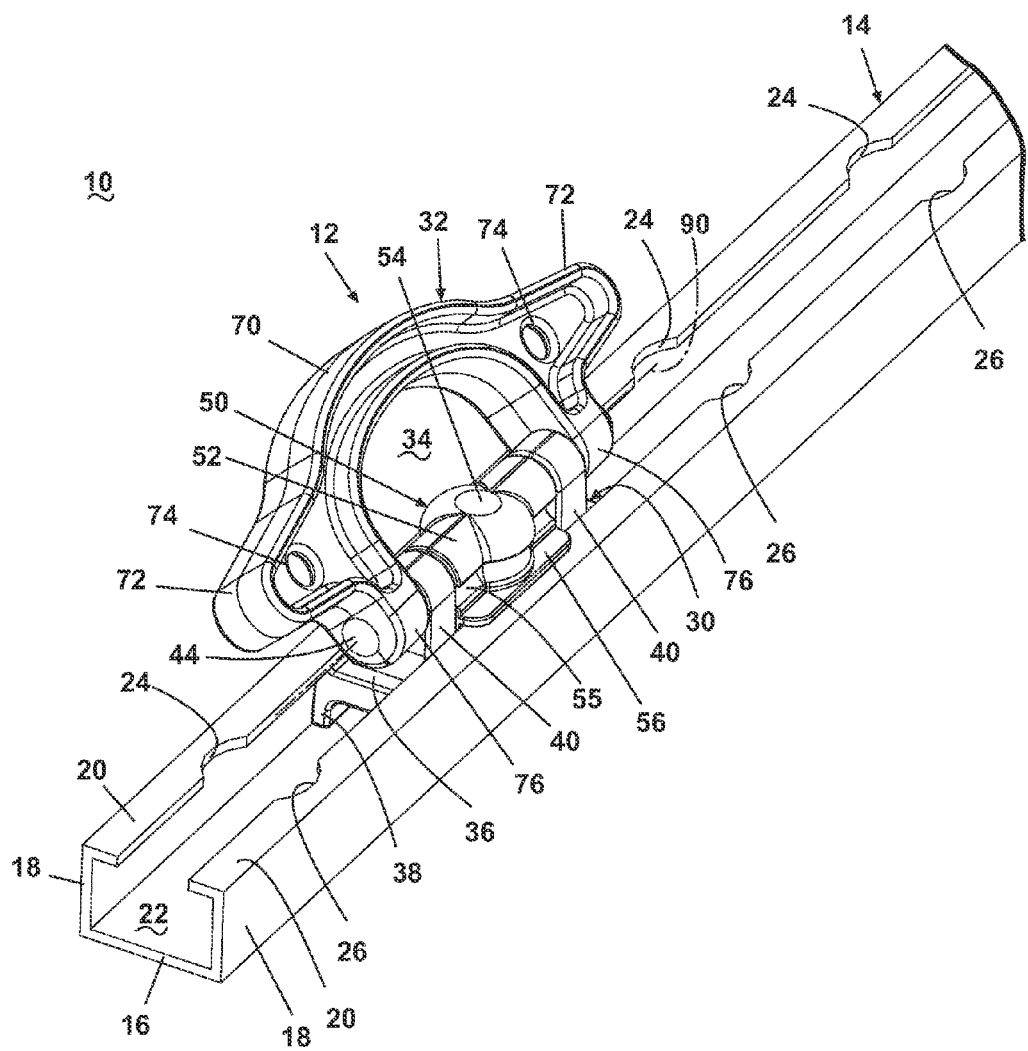
FIG. 6 is a perspective view of the tie-down assembly of FIG. 1 with the cleat in a position intermediate the vertical and horizontal positions illustrated in FIG. 5.

As illustrated in FIGS. 1 and 6, the tie-down attachment assembly 12 is inserted into the raceway 22 of the track 14 by inserting the legs 38 of the base 30 into the raceway 22 between the bottom wall 16 and the flanges 20. A user can lift the lock actuator 50 away from the base 30 against the bias of the spring 82 a distance sufficient to enable the locking projection 60 to exit the arcuate cutouts 24, 26 and clear the flanges 20, as illustrated in FIG. 4. Continued lifting of the lock actuator 50 will maintain the tie-down attachment assembly 12 in an unlocked position, and enable the assembly 12 to be slidingly moved along the track 14 to a selected location.

The tie-down attachment assembly 12 can be locked to the track 14 by engaging the arcuate cutouts 24, 26 in essentially the reverse of the steps described above. The user can slide the tie-down attachment assembly 12 in the unlocked position, i.e. while holding the lock actuator 50 away from the base 30 as illustrated in FIG. 4, to a selected location corresponding to a selected pair of arcuate cutouts 24, 26. The user can then release the lock actuator 50, enabling the locking actuator 50 to move toward the base 30 to a locked position, as shown in FIG. 3, under the influence of the spring 82. The locking projection 60 will be in slidable registry with the arcuate cutouts 24, 26, thereby "locking" the tie-down attachment assembly 12 to the track 14 at the selected location. Additionally, the stops 56 on the lock actuator 50 rest on the flanges 20 to limit the movement of the lock actuator 50 toward the base 30, as illustrated in FIG. 6.

Figure 5:
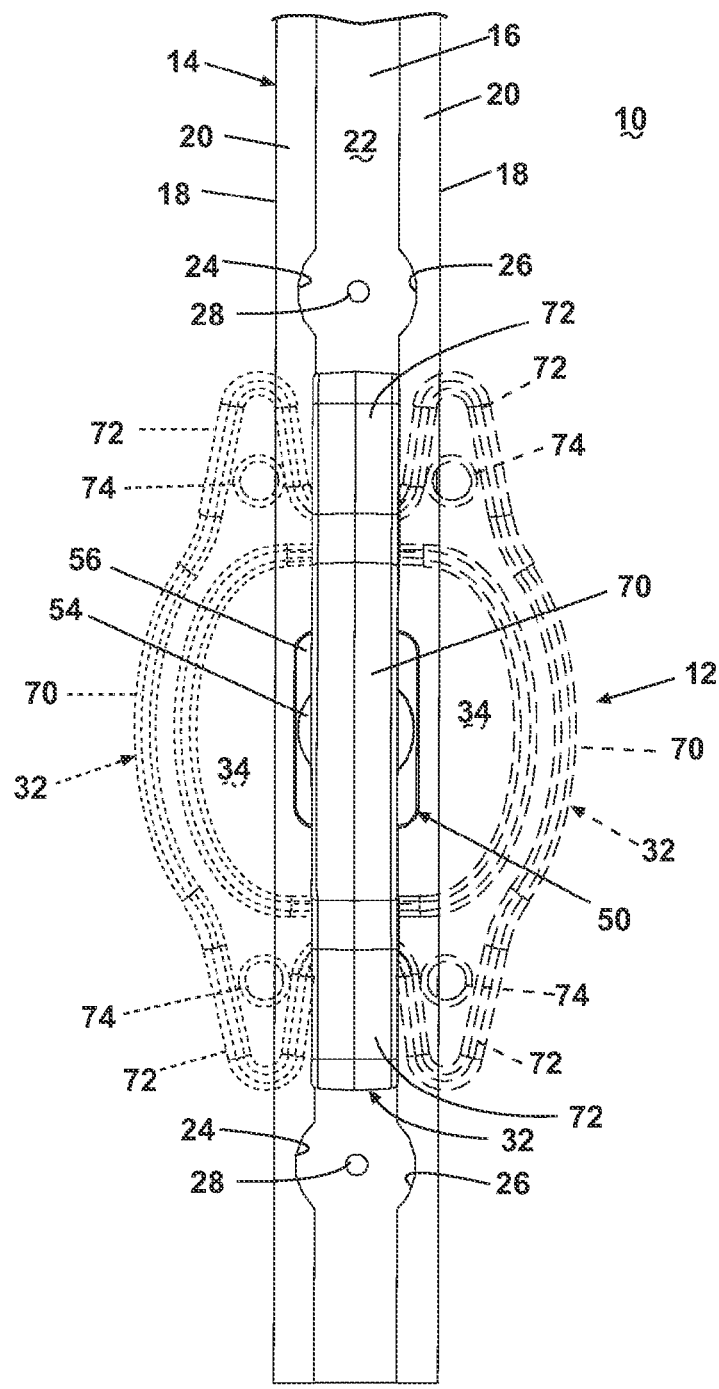
FIG. 5 is a plan view of the tie-down assembly of FIG. 1 illustrating an attachment assembly shown as a cleat in a generally vertical position relative to a track in solid lines and in generally horizontal positions relative to a track in phantom lines.

When the tie-down attachment assembly 12 is secured to the track 14, the user can pivot the cleat 32 to a selected position. The mounting pins 44 define a pivot axis 90, as illustrated in FIG. 3, about which the cleat 32 can pivot. As an example, the cleat 32 of the described exemplary embodiment can pivot from a generally vertical position, illustrated in FIG. 3 and by solid lines in FIG. 5, in either lateral direction to a generally horizontal position, illustrated alternately by dotted and dashed lines in FIG. 5. The cleat 32 can be adapted for any selected range of pivoting motion. The generally horizontal positions shown in dotted and dashed lines in FIG. 5 represent the cleat 32 in stowed, low-profile configurations, effectively inconspicuous, with minimal interference with other objects.

The pivoting ability of the cleat 32 also enhances the effectiveness of the tie-down attachment assembly 12 in securing a load. The cleat 32 can automatically pivot in response to the orientation of the securing line, which results in a greater load rating and increased strength for the tie-down apparatus. As illustrated in FIG. 6, the cleat 32 can be pivoted, for example, forty-five degrees from the upright configuration, to accommodate a tensioned line tied to the cleat 32 from a cargo load lateral of the tie-down attachment assembly 12. The cleat 32 can be maintained in a selected inclined orientation by the interposition of suitably frictional mechanisms, such as ratchets, or materials, such as a gasket or washer, between at least one of the legs 76 and at least one of the complementary mounting lugs 40.

It is within the scope of the invention for the tie-down attachment assembly 12 to have a non-pivoting cleat or other non-pivoting attachment member. If the attachment member is non-pivoting, the attachment member and the base 30 can be integrally fabricated. A pivoting cleat can also be used with other types of bases, including bases that are fixed rather than slidable on a track. Further, the attachment assembly can comprise any suitable attachment member, and is not limited to the cleat illustrated and described herein. Other examples of attachment members include, but are not limited to, links, shackles, blocks, eyelets, rings, loops, and the like.

It is also within the scope of the invention for the tie-down attachment assembly 12 to have more than one attachment member. Thus, a base, suitably adapted, can be coupled with a pair of cleats, laterally or longitudinally spaced, each independently pivotable. Alternatively, the base can be coupled with a cleat and an alternate attachment member, such as a block. Such configurations can be utilized together to secure a single object, or separately to secure separate objects. The coupling of different attachment members with a single base can enable the securing of a load to a selected one of the different attachment members, thereby enhancing the adaptability and usefulness of the tie-down assembly.

A second embodiment of the invention comprising an organization and storage system 100 is illustrated in FIGS. 7-11. This embodiment shares many of the features of the first embodiment, and is not described in detail except as necessary for a complete understanding of the invention. Moreover, common elements of the first and second embodiments described herein are identified with the same reference numerals.

Figure 7:
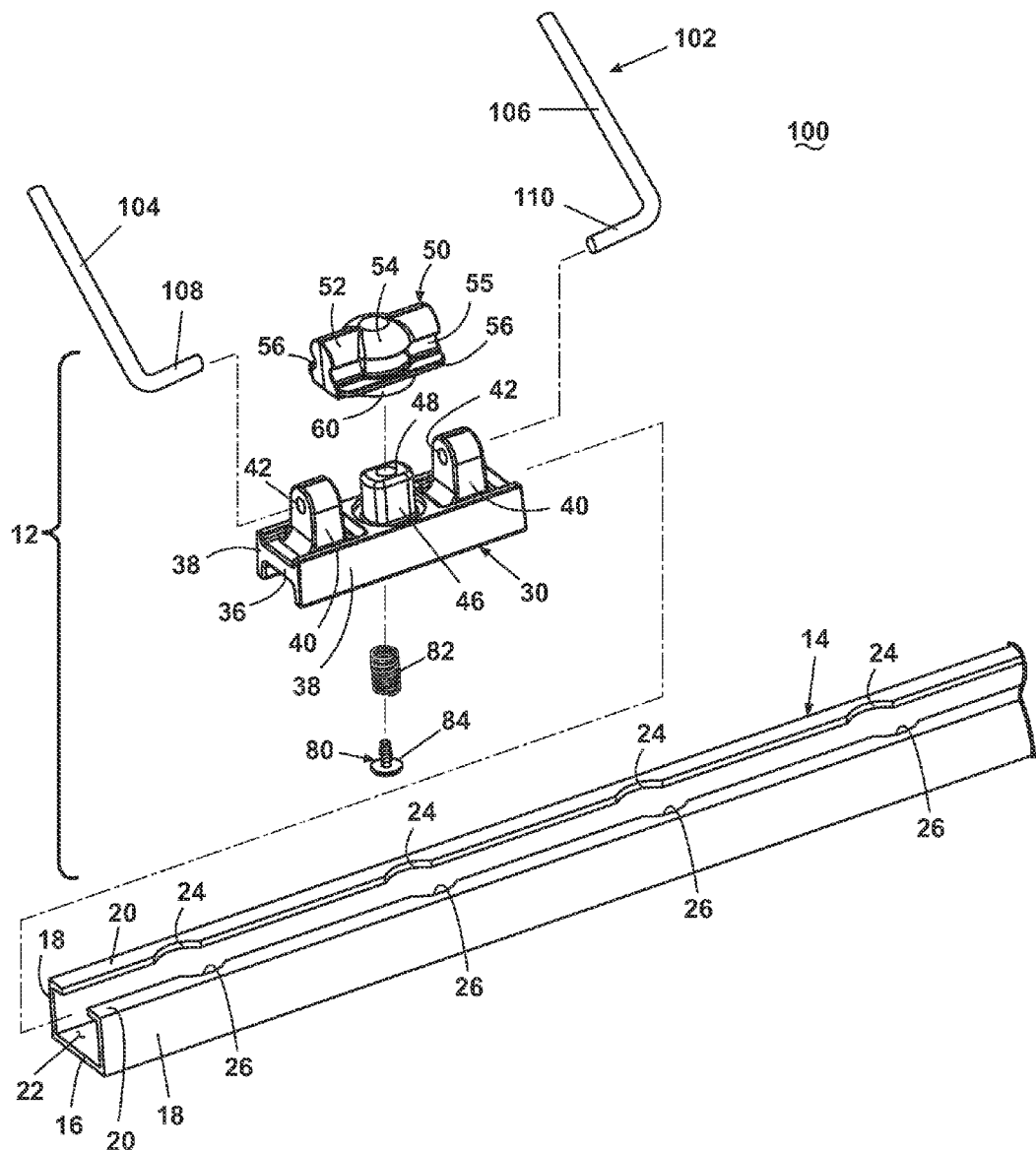
FIG. 7 is an exploded view of a second embodiment of the invention comprising an organization and storage system having an organization and storage assembly slidable within a track.

The principal difference between the embodiment illustrated in FIGS. 1-6 and the embodiment illustrated in FIGS. 7-11 is the substitution of an organization and storage accessory 102 for the cleat 32. Referring to FIG. 7, the organization and storage accessory 102 is illustrated, in part, having a pair of spaced, parallel flexure legs 104, 106, each leg terminating in a journal 108, 110, respectively, disposed orthogonally to the leg 104, 106. The remaining portion of the organization and storage accessory 102 is not illustrated, but will be described further hereinafter.

Figure 8:
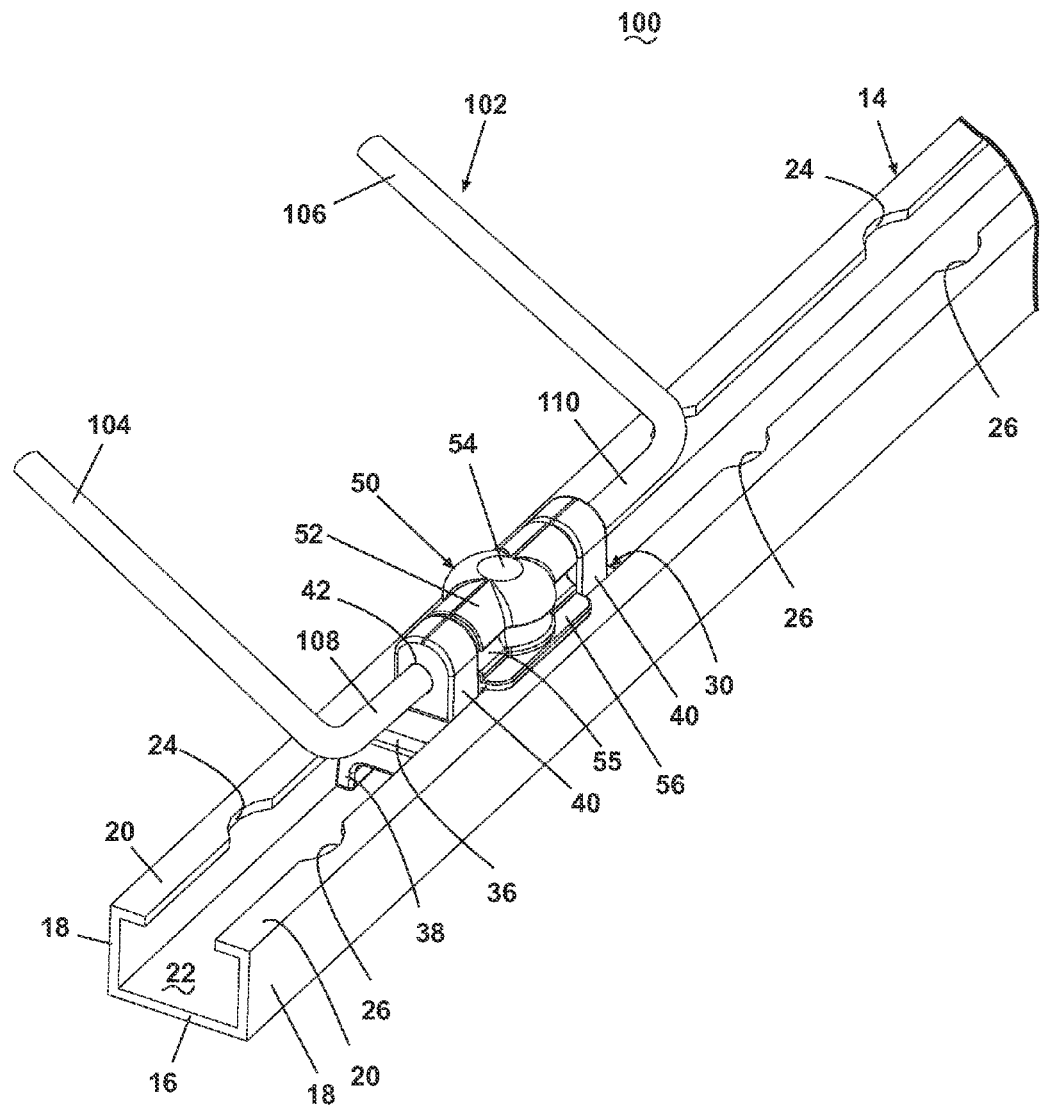
FIG. 8 is a perspective view of the organization and storage system illustrated in FIG. 7.

The base 30, locking actuator 50, and track 14 are, in configuration and operation, as previously described and, combined with the organization and storage accessory 102, comprise the organization and storage system 100. The cleat 32 and mounting pins 44 are omitted. The journals 108, 110 are adapted for rotatable seating in the pillow block apertures 42. As illustrated in FIG. 8, the organization and storage accessory is coupled with the pillow blocks 40 so that the journals 108, 110 are in spaced, longitudinally coaxial disposition.

The operation of the locking actuator 50 to enable the base 30 to be moved along the raceway, or channelway, 22 of the track 14, and be locked into a position corresponding to complementary arcuate cutouts 24, 26, is accomplished as previously described herein.

Figure 9A:
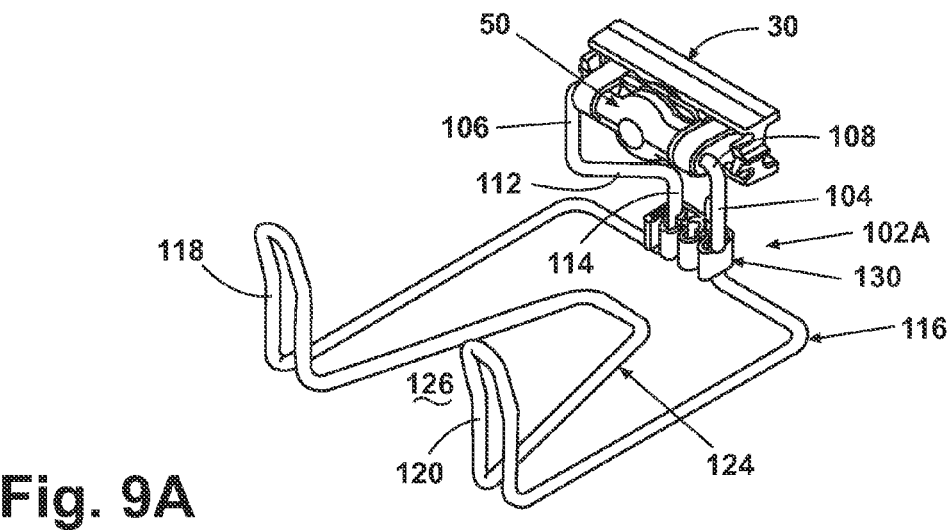
FIG. 9A is a perspective view of the organization and storage assembly illustrated in FIG. 8 having an organization and storage accessory in the form of a utility hanger.
Figure 9B:
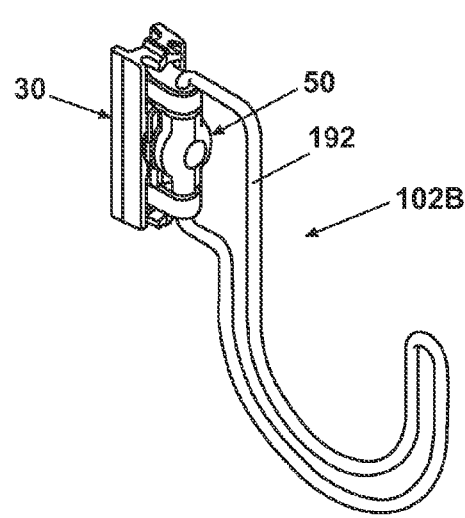
FIG. 9B is a perspective view of the organization and storage assembly illustrated in FIG. 8 having an organization and storage accessory in the form of a hook.
Figure 9C:
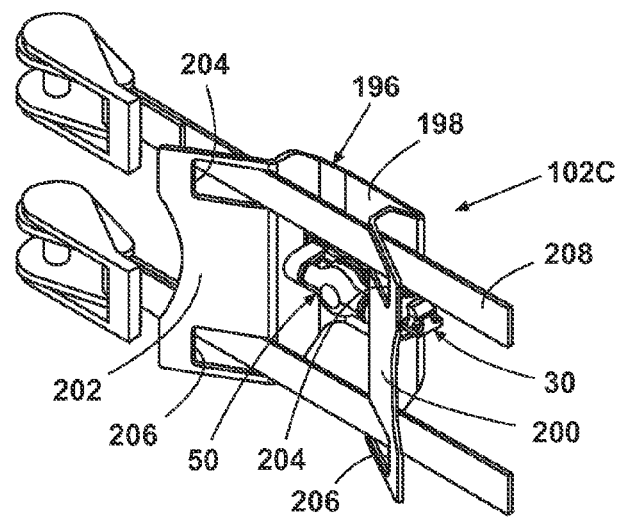
FIG. 9C is a perspective view of the organization and storage assembly illustrated in FIG. 8 having an organization and storage accessory in the form of a cylinder holder.

FIGS. 9A-C illustrate examples of organization and storage accessories that can be used with the base and locking actuator.

FIG. 9A illustrates a utility hanger 102A having flexure legs 104, 106 and journals 108, 110, as previously described. One of the flexure legs 106 transitions orthogonally to a lateral extension 112, which then transitions orthogonally into a support extension 114, which is aligned parallel with the flexure leg 104. The flexure leg 104 and support extension 114 are coplanar, and transition orthogonally to a planar platform 116 so that the platform 116 is generally orthogonal to a supporting vertical surface (not shown) to which the track 14 can be mounted.

The platform 116 is a generally rectilinear wire-form device fabricated of a material having sufficient strength and durability for the purposes described herein. The platform 116 terminates in a pair of retaining arms 118, 120 spaced away from, and parallel to, the supporting vertical surface. Retaining arms 118, 120 transition medially into a hanger bight 124 defining a hanger slot 126 opening away from the base 30 and locking actuator 50. The hanger bight 124 is coplanar with the platform 116 except for the orthogonally disposed retaining arms 118, 120.

An accessory clip 130, described hereinafter, is coupled with the flexure leg 104 and support extension 114 to hold the flexure leg 104, support extension 114, and journals 108, 110 in a selected configuration and prevent separation of the flexure leg 104 and support extension 114 which could result in inadvertent unseating of the journals 108, 110 from the apertures 42.

As can be seen, the utility hanger 102A is adaptable to support an article (not shown) on the platform 116. If the article is an elongated member, such as a pipe, a piece of lumber, a ladder, and the like, a pair of utility hanger 102A can be mounted in tandem to a horizontally disposed track 14 and spaced a selected distance to support the elongated member. The retaining arms 118, 120 can prevent the unintended movement of articles from the platform 116. Additionally, tools, such as rakes, brooms, shovels, and the like, can be hung from the platform 116 by inserting the tool into the hanger slot 126 so that the tool handle extends vertically downward. The head of the tool will be supported by the hanger bight 124, if not the entire platform 116.

The utility hanger 102A is illustrated herein as a wire-form device which can be readily disconnected from the base 30 and locking actuator 50 by unseating the journals 108, 110 from the apertures 42 of the pillow blocks 40. If present, the accessory clip 130 can be removed, and the flexure legs 104, 106 can be pulled away from each other until at least one of the journals 108, 110 clears the end of a pillow block 40, enabling the other journal 108, 110 to be similarly removed. The flexibility of the utility hanger 102A enables the ready coupling and uncoupling of the utility hanger 102A relative to the base 30.

The utility hanger 102A can alternatively be fabricated of a combination of wire elements making up the flexure legs 104, 106, journals 108, 110, lateral extension 112 and support extension 114 coupled with a plate-like platform (not shown) having a hanger slot extending therein. The utility hanger 102A can also be configured without the retaining arms 118, 120. The platform 116 can also be replaced by a boxlike or basketlike container (not shown) suitably coupled to the flexure leg 104 and support extension 114 for organization and storage of relatively small devices. It will be apparent to a person of ordinary skill in the relevant art that a utility hanger can assume other configurations in addition to those described and illustrated herein to provide any number of alternative organizational and storage capabilities. The embodiments described herein are for illustrative purposes only and are not intended to limit the invention in any way.

Referring now to FIG. 9B, the organization and storage accessory is illustrated as a vertical hook 102B, also fabricated of wire 192. The vertical hook 102B is configured to be mounted to a base 30 for movement along a track 14 that extends vertically along a surface so that the hook 102B can be moved and located at a selected height. The wire 192 is configured to have flexure legs 104, 106 and journals 108, 110 for seating into the apertures 42. The hook 102B can be removed from the base 30 by spreading the legs 104, 106 apart to unseat the journals 108, 110 from the apertures 42 in a manner similar to that described for the utility hanger 102A. The hook 102B can be utilized to hang fabric items such as clothing, tools, elongated members, ladders, and the like, when utilized in tandem. One hook 102B can be installed at a given height along a first vertical track 14, and a second hook 102B can be installed at the same height along a second vertical track 14, to horizontally support an elongated member.

A similar hook structure (not shown) can be configured for support by a horizontally disposed base and locking actuator to accommodate horizontal movement of the hook along the track 14. The hook would have a pair of flexure legs 104, 106 and journals 108, 110 disposed generally as illustrated in FIGS. 7 and 8, suitably transitioning to a hook having the general configuration illustrated in FIG. 9B.

FIG. 9C illustrates a cylinder holder 102C comprising a cylinder stay 196, one or more straps 208, and the base 30 and locking actuator 50. The cylinder stay 196 is a generally bilaterally symmetrical body fabricated of a thin material, such as steel, high-strength plastic, and the like, having sufficient strength and durability for the purposes described herein. The cylinder stay 196 has a back wall 198 that can have a suitable opening (not shown) to accommodate the locking actuator 50 for access to the locking actuator 50 from the visible side of the cylinder holder 102C. Sidewall flanges 200, 202 extended from the back wall 198 and can take a configuration suitable for cradling of a cylinder (not shown) without interference from the locking actuator 50. The sidewall flanges 200, 202 can be provided with flange apertures (not shown) configured and aligned for coaxial disposition relative to the pillow block apertures 42 so that pins 44 can be inserted through the flange apertures into the pillow block apertures 42 to secure the cylinder holder 102C to the base 30 and locking actuator 50.

The sidewall flanges 200, 202 are provided with suitable strap openings 204, 206 for receipt of a web portion of a strap 208 of suitable length to extend around the circumference of a cylinder, terminating in a cinching apparatus, such as a quick-release buckle, to secure the web to itself to hold the cylinder against the cylinder stay 196.

The cylinder holder 102C is illustrated for utilization in a track that is horizontally disposed along a surface. While the illustrated cylinder holder 102C is shown with 2 straps 208, the circumcincture of the straps 208 will be limited to a relatively small portion of the overall length of the cylinder. If a cylinder may become inadequately retained by a single cylinder holder 102C, a pair of cylinder holders 102C can be positioned in a pair of vertically separated, parallel, horizontal tracks 14 to secure the cylinder at an upper portion and a lower portion. Alternatively, the base 30 and locking actuator 50 can be oriented for coupling along a vertically disposed track 14. This will facilitate the positioning of the cylinder holder 102C to optimize the securing of a selected cylinder. Alternatively, a pair of cylinder holders 102C could be spaced along a vertical track 14 to secure the cylinder at an upper portion and a lower portion.

Although 3 organization and storage accessories have been described and illustrated, the invention is not so limited. Other accessories can be configured for coupling with the base 30 such as a towel holders, utility rings, specialized accessories configured to hold selected tools or articles, devices to couple movable screens or panels to permanent walls, and the like.

Figure 10:
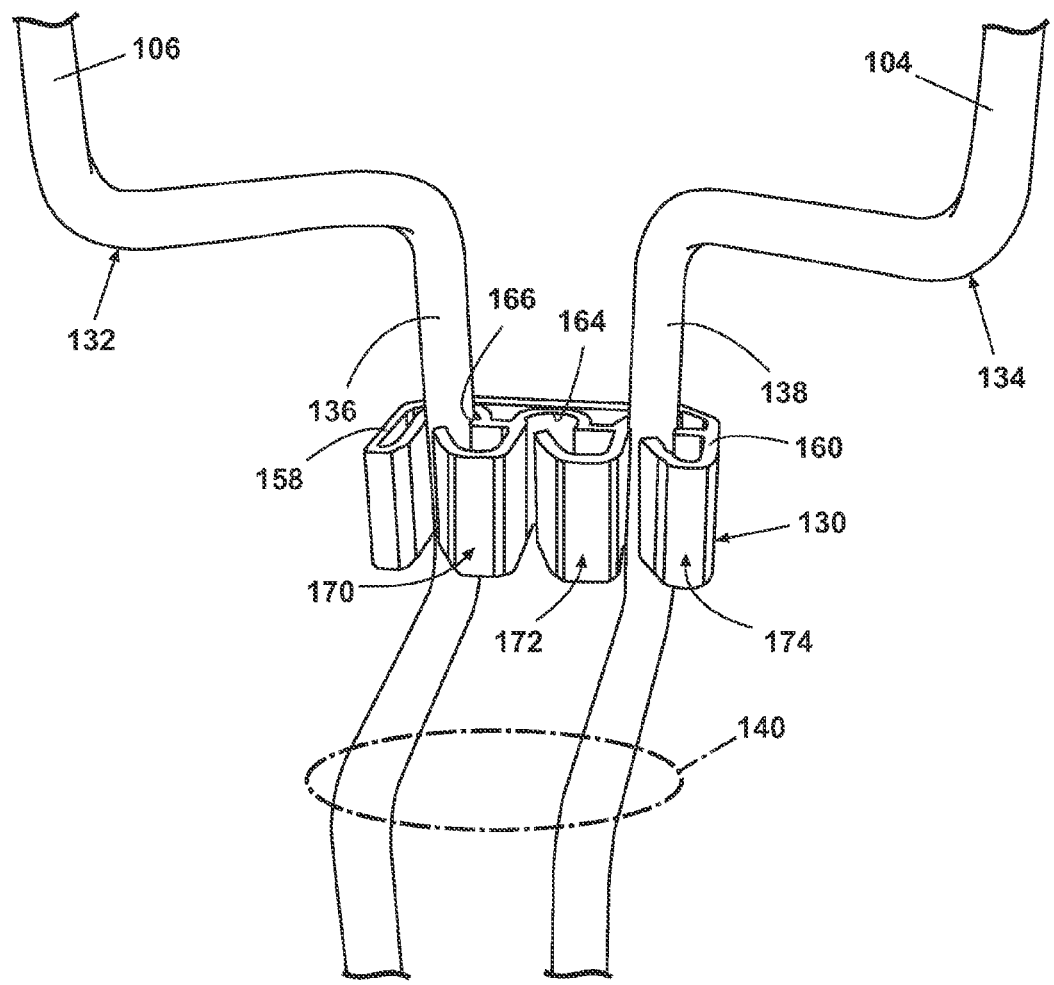
FIG. 10 is an enlarged perspective view of a part of an organization and storage accessory having an accessory clip.

Referring now to FIG. 10, an accessory clip 130 is illustrated coupled with a clip section 136, 138 forming part of an organization and storage accessory and extending from support structures 132, 134 having flexure legs 104, 106 and journals 108, 110 generally as described previously herein. The clip sections 136, 138 transition from the flexure legs 104, 106 to a functional element 140 such as a platform, hanger, hook, and the like.

Figure 11:
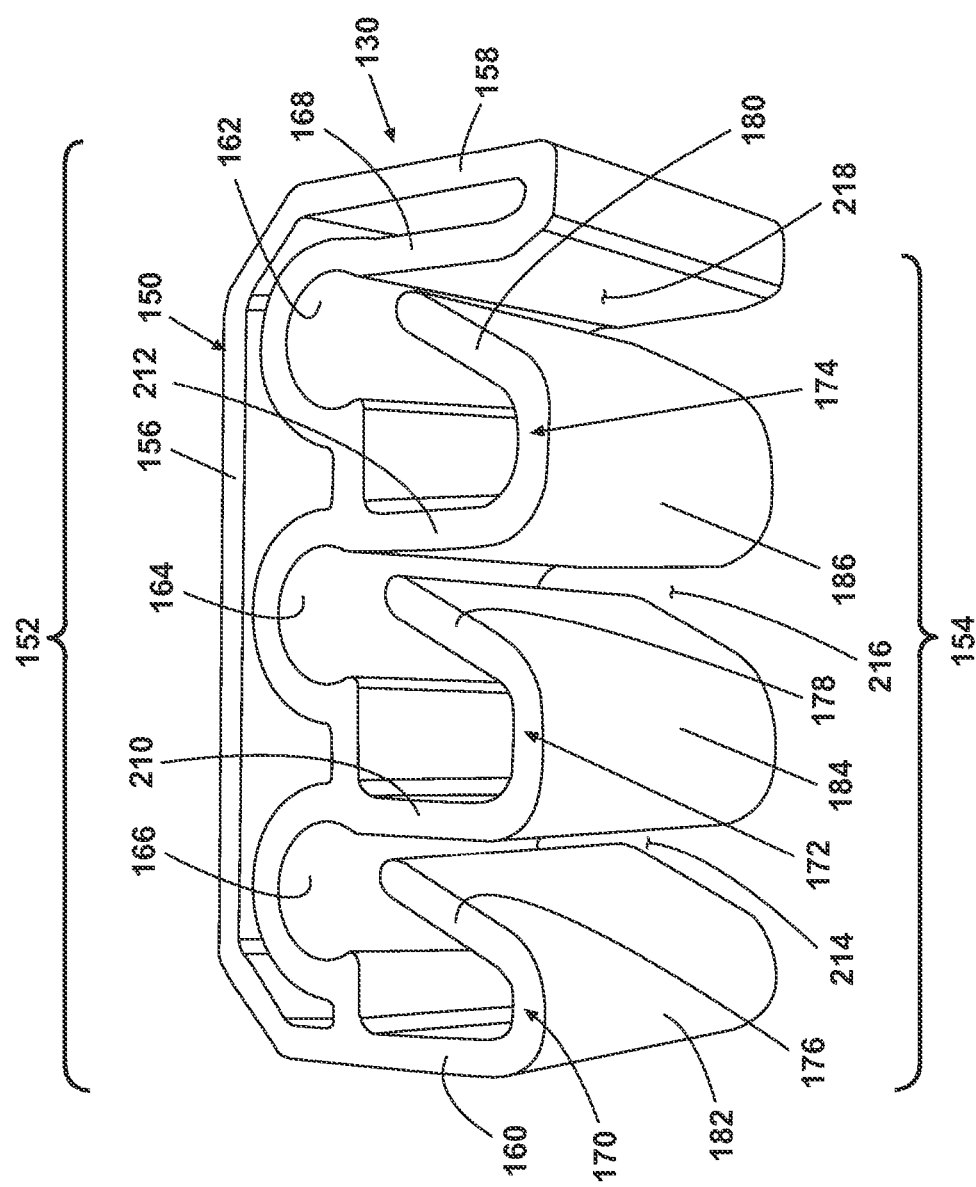
FIG. 11 is an enlarged perspective view of the accessory clip illustrated in FIG. 10.

Referring specifically to FIG. 11, the accessory clip 130 is illustrated as a somewhat open, frame-like body comprising a housing 150 and biased wire retainers 170, 172, 174. The housing 150 has an exterior rear wall 156 extending along a receptacle wall 152 having a plurality of rod receptacles 162, 164, 166, each having a semi-circular configuration. Extending generally orthogonally away from the rear wall 156 in parallel, spaced disposition, are sidewalls 158, 160. The sidewall 158 transitions to a generally parallel, inwardly spaced inner wall 168, which in turn transitions to a rod receptacle 162. The biased wire retainer 170 transitions from the sidewall 160, and comprises a bight section 182 and a retainer plate 176 extending toward the receptacle 166. The wire retainers 170, 172, 174 collectively define a flexure wall 154.

The bight section 182 extends from the sidewall 160 to the retainer plate 176 to enable the retainer plate 176 to be resiliently displaced toward the sidewall 160 to enable a member, such as a rod, to be inserted into the rod receptacle 166. A gap 214 separates the end of the retainer plate 176 and an adjoining support wall 210 forming part of the biased wire retainer 172. The biased wire retainer 172 comprises the support wall 210 transitioning from the rod receptacle 166 into a bight section 182. The bight section 182 transitions into a retainer plate 178 which can resiliently deflect to enable a member to be inserted into the rod receptacle 164. The retainer plate 178 is separated by a gap 216 from an adjoining support wall 212, and transitions from the rod receptacle 164 into the bight section 186, which in turn transitions to the retainer plate 180. The retainer plate 180 can be displaced to enable a member to be received within the rod receptacle 162. The end of the retainer plate 180 is spaced away from the inner wall 168 to define a gap 218.

The housing 150 can be resiliently deformed by bending the rear wall 156 so that the sidewalls 158, 168, are moved away from the sidewall 160. At the same time, this bending movement will open the gaps to enable the members to be removed from the rod receptacles 162, 164, 166. Releasing the housing 150 will return the housing 150 to an at-rest configuration illustrated in FIG. 11.

Figure 12:
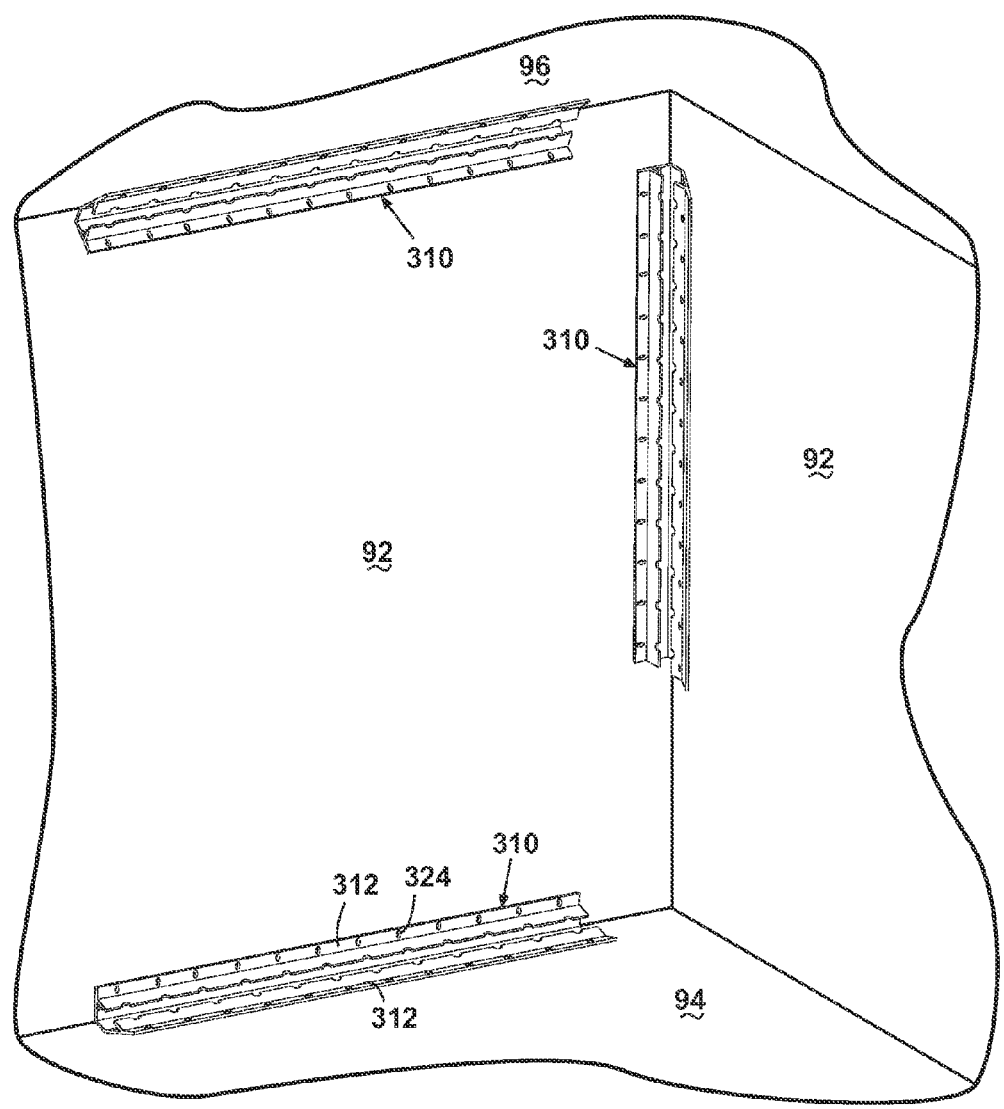
FIG. 12 is a perspective view of a third embodiment of the invention comprising a portion of a cargo hold with a plurality of tracks mounted to selected corners of the cargo hold for supporting organization and storage assemblies.
Figure 13:
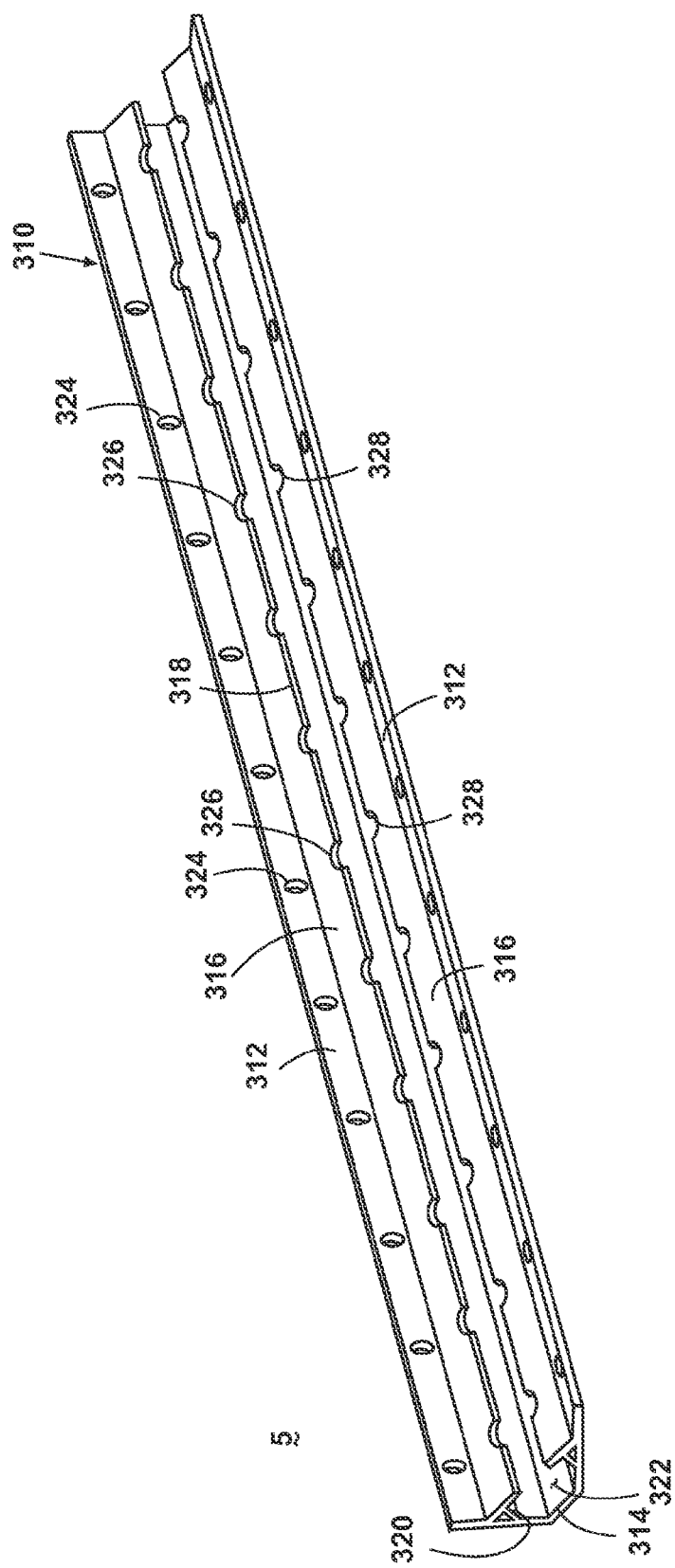
FIG. 13 is an enlarged perspective view of the track illustrated in FIG. 12 supporting a movable organization and storage assembly.
Figure 14:
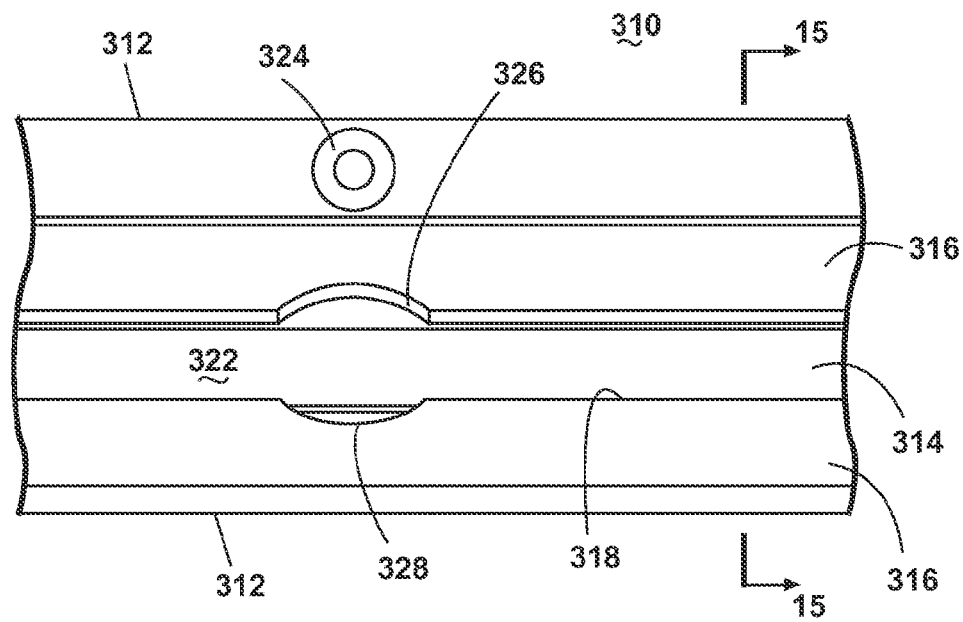
FIG. 14 is an enlarged perspective view of a portion of the track illustrated in FIG. 13.

The track has been described and illustrated as an elongated, generally rectilinear member adapted for mounting to a generally planar surface. Alternatively, the track can be adapted for mounting in a corner, as illustrated in FIG. 12, such as the corner of a cargo hold or bed, and supporting the previously-described organization and storage system 100. Referring to FIGS. 13 and 14, the track 310 can be an elongated member comprising a pair of elongated, plate-like side walls, or legs 312, each joined along one longitudinal edge to a bottom connecting wall 314 disposed at an angle of about 135°. The legs 312 can be disposed at a 90° angle to enable the track 310 to be mounted in a corner, as hereinafter described. The legs 312 and the connecting wall 314 define a longitudinally extending channel having in cross-section the shape of an isosceles trapezoid, and defining, in part, a raceway 322.

Figure 15:
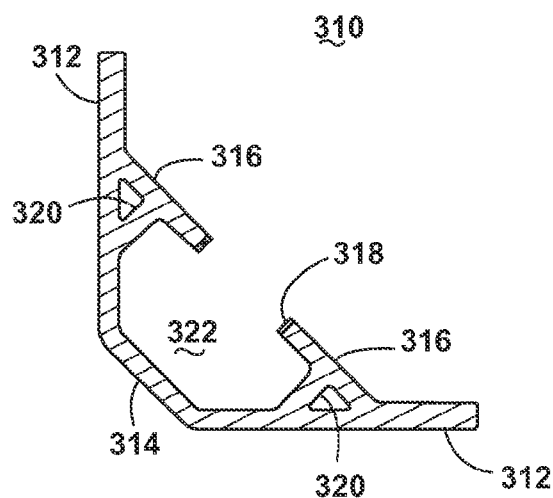
FIG. 15 is a sectional view of the portion of the track illustrated in FIG. 14 taken along view line 15-15.

As illustrated in FIG. 15, each leg 312 defines a plane that intersects with the other leg at a 90° angle for mounting the track 310 at the intersection of two surfaces such as a corner between a wall and a ceiling, a wall and a floor, or two walls. Each leg 312 is illustrated as extending short of an intersection with the other leg, and is interrupted by and connected to the connecting wall 314. The connecting wall 314 can therefore be disposed at a selected angle between each pair of legs 312. The length of the connecting wall 314 is defined by the point at which it intersects with each leg 312. In other words, the connecting wall 314 can have its shortest length when it is located nearest the projected 90° intersection of the legs 312, and can be at its longest when it is located nearer the free ends of the legs 312. While the embodiment illustrated in FIG. 15 shows the legs 312 terminating where they intersect with the connecting wall 314, the legs 312 can extend past their intersection with the connecting wall 314 to intersect each other at a 90° angle.

Extending from each leg 312 into the longitudinally extending channel is a pair of longitudinally elongated, opposed, coplanar flanges 316. The flanges 316 can be separated by a slot 318 for accommodating the organization and storage system 100. As illustrated in FIG. 15, the configuration of the flanges 316 and the legs 312 can be bilaterally symmetrical, with each flange 316 partially coupled to an associated leg 312 by a plate-like longitudinal web 320 extending orthogonally from the underside of the flange 316 to the leg 312. The webs 320 need not be thin plates as shown, but can be triangular gusset-like buttresses extending between the legs 312 and the flanges 316, or need not be present at all. Pairs of opposing arcuate cutouts 326, 328 can be disposed at spaced intervals along the flanges 316 to form notches that define locking locations for the organization and storage system 100.

As illustrated in FIG. 14, the legs 312 also include apertures 324 spaced along the free end of each leg 312, for receiving screws, bolts, or other mechanical couplers to mount the track 310 into a selected corner, such as a corner in a cargo hold. Mounting of the track 310 is not limited to a mechanical coupler connection, and the track 310 can be mounted to the desired surface in any suitable manner, including, for example, the use of adhesives or welding.

A portion of the legs 312, the connecting wall 314, a portion of the flanges 316, and the webs 320 extend longitudinally together to define the raceway 322 for slidably receiving the base 30 of the organization and storage system 100 as previously described and illustrated herein with respect to the generally rectilinear track 14.

FIG. 12 illustrates alternative mountings of the track 310 and the organization and storage system 100. The track 310 can be mounted in a corner at the intersection of two surfaces through fasteners (not shown) projecting through the apertures 324 into a wall 92, a floor 94, or a ceiling 96. The track 310 can be mounted horizontally between a wall 92 and a floor 94, or a wall 92 and a ceiling 96. The track 310 can also be mounted vertically at the intersection of two walls 92. Once the track 310 is mounted, it can be used in combination with the organization and storage system 100 or tie-down systems incorporating cleats, eyelets, loops, and the like.

While the invention has been specifically described in connection with certain specific embodiments thereof, it is to be understood that this is by way of illustration and not of limitation, and the scope of the appended claims should be construed as broadly as the prior art will permit.

What is claimed is:

1. An adjustable organization and storage system comprising:
    a track for attachment to at least one surface, having a generally polygonal channelway extending longitudinally therealong and defined by a bottom wall, a pair of side walls, and a pair of flanges in coplanar disposition, the flanges defining an intervening slot extending longitudinally therealong and opening into the channelway, with at least one arcuate cutout interspersed along the slot; and
    an organization and storage assembly comprising:
        a base configured for at least partial enclosure in, and slidable translation along, the channelway;
        a lock actuator movably coupled with the base, having a biasing element for exerting a force orthogonal to the bottom wall when the base is at least partially enclosed in the channelway, and a locking projection disposed toward the base and receivable in the at least one arcuate cutout for selective engagement of the locking projection with the at least one arcuate cutout under the influence of the biasing element; and
        an organization and storage accessory;
    wherein the organization and storage assembly can be selectively positioned along the track from a first arcuate cutout to a second arcuate cutout by moving the lock actuator against the force exerted by the biasing element to separate the locking projection from the first arcuate cutout, moving the organization and storage assembly along the track to the second arcuate cutout, and releasing the lock actuator so that the locking projection engages the second arcuate cutout under the influence of the force exerted by the biasing element.

2. An organization and storage system according to claim 1 wherein the organization and storage accessory comprises at least one of a utility hanger, a hook, a cylinder holder, a towel holder, and a utility ring.

3. An organization and storage system according to claim 1 wherein the organization and storage accessory is pivotally coupled with the base.

4. An organization and storage system according to claim 3, the base further comprising a mounting lug adapted to extend through the slot when the base is at least partially enclosed within the channelway, wherein the organization and storage accessory is pivotally coupled with the mounting lug.

5. An organization and storage system according to claim 1 wherein the biasing element comprises a helical spring for urging the locking projection into the at least one arcuate cutout.

6. An organization and storage system according to claim 1 wherein the lock actuator comprises at least one stop extending laterally therefrom to arrest movement of the lock actuator toward the base.

7. An organization and storage system according to claim 1 wherein the track has one of a rectilinear cross-section and an isosceles trapezoidal cross-section.

8. An adjustable organization and storage system comprising:
    a track for attachment to at least one surface, having a generally polygonal channelway extending longitudinally therealong and defined by a bottom wall, a pair of side walls, and a pair of flanges in coplanar disposition, the flanges defining an intervening slot extending longitudinally therealong and opening into the channelway, with at least one arcuate cutout interspersed along the slot; and
    an organization and storage assembly comprising:
        a base configured for at least partial enclosure in, and slidable translation along, the channelway;
        a lock actuator movably coupled with the base, having a biasing element for urging the lock actuator toward the base when the base is at least partially enclosed in the channelway, and a locking projection disposed toward the base and receivable in the at least one arcuate cutout for selective engagement of the locking projection with the at least one arcuate cutout under the influence of the biasing element; and;

an organization and storage accessory coupled with the base;

wherein the base and the organization and storage accessory can be concurrently translated along the track when the locking projection is moved away from the base and disengaged from the at least one arcuate cutout.

9. An organization and storage system according to claim 8 wherein the organization and storage accessory is pivotally coupled with the base.

10. An organization and storage system according to claim 8 wherein the organization and storage accessory comprises at least one of a utility hanger, a hook, a cylinder holder, a towel holder, and a utility ring.

11. An organization and storage system according to claim 8, and further comprising a mounting lug, mounted to the base, and adapted to extend through the slot when the base is at least partially enclosed within the channelway, wherein the organization and storage accessory is pivotally coupled with the mounting lug.

12. An organization and storage system according to claim 8 wherein the biasing element comprises a helical spring for urging the locking projection into the at least one arcuate cutout.

13. An organization and storage system according to claim 8 wherein the lock actuator comprises at least one stop extending laterally therefrom to arrest movement of the lock actuator toward the base.

14. An organization and storage system according to claim 8 wherein the track has one of a rectilinear cross-section and an isosceles trapezoidal cross-section.

15. An organization and storage assembly adapted for movable coupling with a track having a partially enclosed polygonal channelway and at least one arcuate cutout, the organization and storage assembly comprising:

a base having a sectional configuration for at least partial enclosure in a polygonal channelway and slidable translation therealong;

a mounting lug mounted to the base, and adapted to extend exteriorly of a polygonal channelway when the base is at least partially enclosed in a polygonal channelway;

a lock actuator movably coupled with the base, having a biasing element for urging the lock actuator orthogonally toward the base when the base is at least partially enclosed in a polygonal channelway, and a locking projection disposed toward the base and receivable in at least one arcuate cutout for selective engagement of the locking projection with at least one arcuate cutout under the influence of the biasing element; and a first organization and storage accessory resiliently coupled with the mounting lug for support of an article;

wherein the first organization and storage accessory can be selectively uncoupled from the mounting lug when the base is at least partially enclosed in a polygonal channelway to enable coupling of a second organization and storage accessory with the mounting lug without uncoupling the organization and storage assembly from a track.

16. An organization and storage assembly according to claim 15 wherein the organization and storage accessory comprises at least one of a utility hanger, a hook, a cylinder holder, a towel holder, and a utility ring.

17. An organization and storage assembly according to claim 15 wherein the mounting lug comprises an aperture, and the organization and storage accessory comprises at least one journal adapted for pivotal coupling with the aperture.

18. An organization and storage assembly according to claim 17 wherein the at least one journal comprises two journals in longitudinally coaxial spaced disposition.

19. An organization and storage assembly according to claim 18 wherein each journal comprises a terminus of a resilient member, and is removable from the aperture by elastic bending of the resilient member away from the mounting lug.

20. An organization and storage assembly according to claim 19, and further comprising an accessory clip for engaging the resilient members and preventing separation of the two journals.

21. An organization and storage assembly according to claim 15 wherein the biasing element comprises a helical spring for urging the locking projection into at least one arcuate cutout.

22. An organization and storage assembly according to claim 21 wherein the lock actuator comprises at least one stop extending laterally therefrom to arrest movement of the lock actuator toward the base.

23. An organization and storage assembly according to claim 15 wherein the lock actuator comprises at least one stop extending laterally therefrom to arrest movement of the lock actuator toward the base.

\* \* \* \* \*

UNITED STATES PATENT AND TRADEMARK OFFICE
CERTIFICATE OF CORRECTION

| | | |
|---|---|---|
| PATENT NO. | : 7,980,798 B1 | Page 1 of 1 |
| APPLICATION NO. | : 12/471715 | |
| DATED | : July 19, 2011 | |
| INVENTOR(S) | : Kuehn et al. | |

It is certified that error appears in the above-identified patent and that said Letters Patent is hereby corrected as shown below:

Column 1, line 47, reads "...for selective engagement of the licking projection..."

It should read: "...for selective engagement of the locking projection..."

Signed and Sealed this
Sixteenth Day of August, 2011

David J. Kappos
*Director of the United States Patent and Trademark Office*